United States Patent [19]

Hamada et al.

[11] Patent Number: 4,816,724
[45] Date of Patent: Mar. 28, 1989

[54] DISPLAY DEVICE AND METHOD OF DRIVING THE SAME

[75] Inventors: Kiyoshi Hamada, Osaka; Kaoru Tomii, Isehara; Junpei Hashiguchi; Kinzo Nonomura, both of Osaka, all of Japan

[73] Assignee: Matsushita Electric Industrial Co., Ltd., Japan

[21] Appl. No.: 27,211

[22] Filed: Mar. 17, 1987

[30] Foreign Application Priority Data

Mar. 20, 1986 [JP] Japan .................................. 61-62309

[51] Int. Cl.[4] .................. H01J 29/70; H01J 29/72
[52] U.S. Cl. ...................................... 315/366; 313/422
[58] Field of Search ............. 315/366, 383, 384, 385, 315/169.1, 106, 107; 313/422; 328/270

[56] References Cited

U.S. PATENT DOCUMENTS

3,980,822  9/1976  Suzuki et al. ........................ 315/383
4,167,690  9/1979  Gange .
4,451,846  5/1984  Iyehara et al. .
4,535,272  8/1985  Ueda et al. .

Primary Examiner—Theodore M. Blum
Attorney, Agent, or Firm—Lowe, Price, LeBlanc, Becker & Shur

[57] ABSTRACT

During a period in which electron beam emission to a photo-emissive screen is inhibited, a heating current is supplied to a cathode. During a period in which electron beam emission to the screen is enabled, the supply of the heating current to the cathode is interrupted and the potential at the cathode is varied with a video signal. During the beam emission enabling period, the interruption of the heating current supply allows the electron beam to be uniform along the cathode, since the heating current would cause a potential gradient or variation along the cathode. In addition, during the beam emission enabling period, since the cathode potential is varied with the video signal, the electron beam is modulated in accordance with the video signal.

16 Claims, 7 Drawing Sheets

DISPLAY DEVICE AND METHOD OF DRIVING THE SAME

BACKGROUND OF THE INVENTION

1. Field of the Invention

This invention relates to a display device using cathode ray. This invention also relates to a method of driving the display device.

2. Description of the Prior Art

U.S. Pat. No. 4,451,846 discloses an advanced flat-type cathode-ray tube display which includes a plurality of parallel line cathodes for producing respective electron beams, a screen exposed to the electron beams and converting them into corresponding lights, and a plurality of parallel control grid electrodes for modulating the levels of beam current of the respective electron beams in accordance with display data. The flat type display also includes several groups of other grid electrodes, vertical scanning electrodes, and beam deflecting and focusing electrodes.

In the flat type display of U.S. Pat. No. 4,451,846, since the electron beams are respectively modulated by the separate control grid electrodes, even small errors in positional relationships of the control grid electrodes with the other electrodes or the cathodes can cause considerably unequal modulations of the electron beams and cause an unacceptable inequality in the electron beams. In addition, since each of the control grid electrodes is in the form of a plate, the capacitances between the control grid electrodes and adjacent electrodes are large. In other words, the load capacitance of a modulation circuit including the control grid electrodes is large.

U.S. Pat. No. 4,535,272 also discloses a flat-type cathode-ray tube display including a plurality of parallel line cathodes. In this display, the line cathodes are heated by currents which are supplied from a power source via respective switching transistors. Each of these switching transistors periodically moves between a conductive state and an unconductive state, so that the supply of the heating current to the associated line cathode is periodically enabled and inhibited. Specifically, during a period in which one line cathode is allowed to emit electrons, the supply of the heating current to the line cathode is interrupted. During other periods, the supply of the heating current to the line cathode is enabled. This periodical or intermittent supply of the heating currents to the line cathodes via the switching transistors is to save electric power.

SUMMARY OF THE INVENTION

It is an object of this invention to provide a display device and a method of driving the same which can produce acceptably equal electron beams.

It is another object of this invention to provide a display device and a method of the driving the same which allow a small load capacitance of a modulation circuit.

In accordance with a first aspect of this invention, a display device includes a cathode for producing an electron beam, and a screen for emitting light in accordance with the electron beam. During a first period, the production of the electron beam is inhibited and a heating current is supplied to the cathode to heat the cathode. During a second period, the production of the electron beam is enabled and a video signal is applied to the cathode to modulate the electron beam in accordance with the video signal.

In a second aspect of this invention, a display device includes a cathode for producing electron beam, and a screen for emitting light in accordance with the electron beam. The cathode is heated. A video signal is applied to the cathode to modulate the electron beam in accordance with the video signal.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
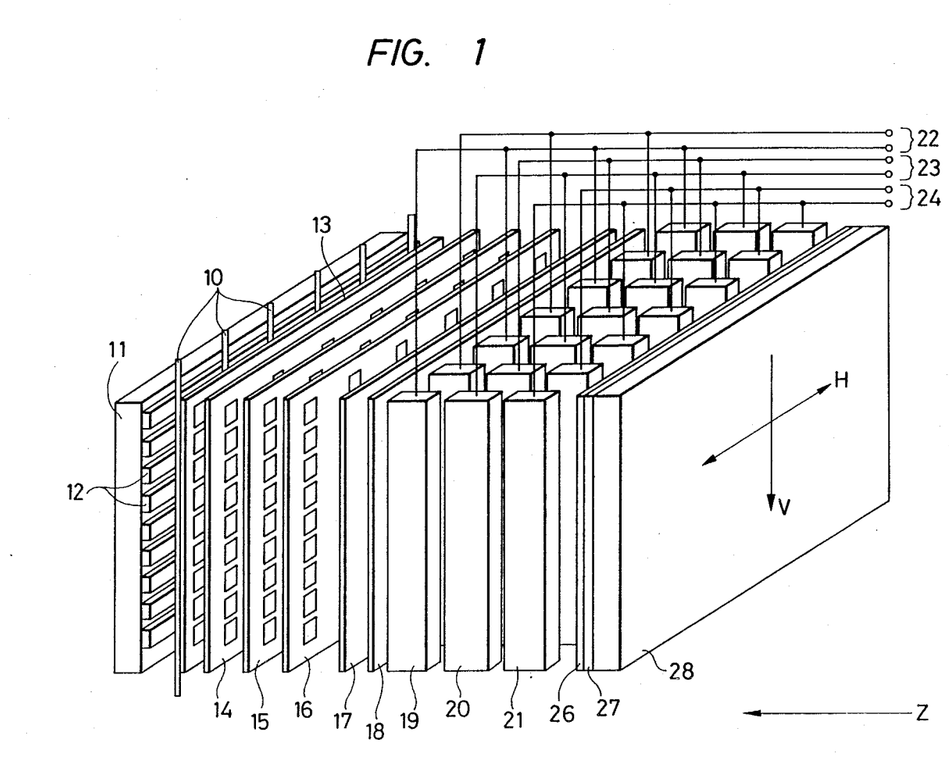
FIG. 1 is a perspective view of an internal structure of a display device according to a first embodiment of this invention.
Figure 2:
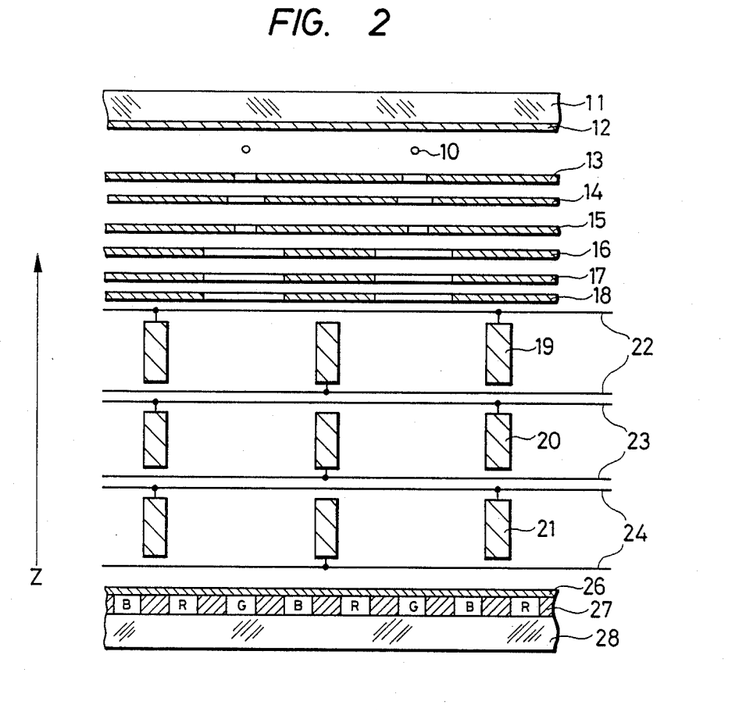
FIG. 2 is a sectional view of the display device of FIG. 1 taken along a horizontal plane.
Figure 3:
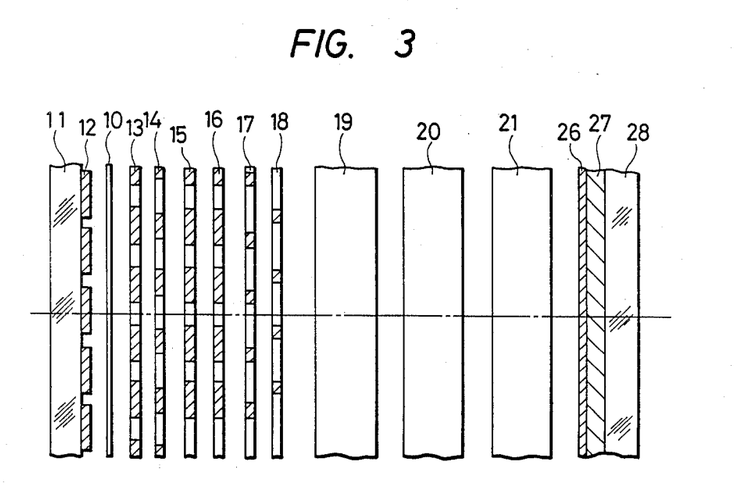
FIG. 3 is a sectional view of the display device of FIG. 1 taken along a vertical plane.

With reference to FIGS. 1-3, a description will be given of a flat-type cathode-ray tube display device. The vacuum enclosure, e.g., glass vessel, of the display device is omitted from the drawings, for greater clarity in describing the internal elements. Generally, such a display device is used to indicate characters, images, and others when oriented as shown in FIG. 1, in which the horizontal direction is denoted by an arrow H and the vertical direction is denoted by an arrow V, and this arbitrarily selected orientation will be assumed throughout the following description.

The display device includes a plurality of parallel line cathodes 10, each consisting of an elongated linear filament which can be formed for example of tungsten wire coated with a suitable oxide material. Each of the line cathodes 10 has a diameter of several tens of $\mu$m. The line cathodes 10 are oriented vertically, and arrayed at regular intervals along the horizontal direction. The line cathodes 10 serve to emit electrons which form beams directed toward a faceplate 28. As will be described in detail hereinafter, the line cathodes 10 also serve to modulate the levels of beam current of the respective electron beams in accordance with display data or with a video signal.

A supporting plate 11, formed of an electrically insulating material, is disposed closely adjacent to the array of the line cathodes 10 on the opposite side of the line cathodes 10 to the faceplate 28. A set of vertical scanning electrodes 12 formed upon the inner surface of the supporting plate 11 face the line cathodes 10. The vertical scanning electrodes 12 are mutually electrically separate, and are each of a horizontally-extending narrow elongated shape and are successively arrayed at regular spacings along the vertical direction. The number of the vertical scanning electrodes 12, in the case of a cathode ray tube for displaying a broadcast television signal, will be ½ of the number of horizontal scanning lines (which is 480 in the NTSC system for example).

A first grid electrode 13, which will be referred to as the G1 electrode, extends between the array of the line cathodes 10 and the faceplate 28. The G1 electrode 13 takes the form of a single plate extending in the vertical direction. The G1 electrode 13 is close to and parallel to the array of the line cathodes 10. The G1 electrode 13 has an array of apertures regularly extending in vertical and horizontal rows. The horizontal rows of the apertures of the G1 electrode correspond to or essentially align with the vertical scanning electrodes 12 respectively. The vertical rows of the apertures of the G1 electrodes 13 correspond to or essentially align with the line cathodes 10 respectively. The G1 electrode 13 serves to apply a suitable bias electric field to the line cathodes 10. To this end, a preset DC bias voltage is applied to the G1 electrode 13.

The apertures in the G1 electrode 13 are preferably circular, having a diameter in the range of 0.5–1.0 mm. The apertures in the G1 electrode 13 may be rectangular or square.

A second grid electrode 14, which will be referred to as the G2 electrode, immediately succeeds the G1 electrode 13 along the electron beam path. The G2 electrode 14 takes the form of a single plate and extends parallel to the G1 electrode 13. The G2 electrode 14 has apertures at positions corresponding to the positions of the apertures in the G1 electrode 13. The G2 electrode 14 serves to derive electron beams from the electrons emitted by the line cathodes 10.

A third grid electrode 15, which will be referred to as the G3 electrode, immediately succeeds the G2 electrode 14 along the electron beam path. The G3 electrode 15 takes the form of a single plate and extends parallel to the G2 electrode 14. The G3 electrode 15 has apertures at positions corresponding to the positions of the apertures in the G2 electrode 14. The G3 electrode 15 serves to shield the beam-generating electric field produced by the G2 electrode 14 from electric fields which are produced by electrodes subsequently disposed along the electron beam path.

A fourth grid electrode 16, which will be referred to as the G4 electrode, immediately succeeds the G3 electrode 15 along the electron beam path. The G4 electrode 16 takes the form of a single plate and extends parallel to the G3 electrode 15. The G4 electrode 16 has apertures at positions corresponding to the positions of the apertures in the G3 electrode 15. Each of the apertures in the electrode G4 16 has a horizontal dimension substantially greater than its vertical dimension.

Parallel plate electrodes 17 and 18 succeed the G4 electrode 16 along the electron beam path. Each of these electrodes 17 and 18 extends parallel to the G4 electrode 16. Each of the electrodes 17 and 18 is formed with an array of apertures which are elongated in the horizontal direction, as for the apertures in the G4 electrode 16. The centers of the apertures in the electrode 17 are out of alignment with or offset with respect to the centers of the apertures in the electrode 18. The combination of these electrodes 17 and 18 serves to produce vertical deflections of the electron beams.

The next electrodes disposed along the beam path are a plurality of horizontal deflection electrodes formed of elongated vertically aligned plates which are arranged as three sets, designated by numerals 19, 20, and 21 respectively. The electrodes in each of these sets are positioned at regular spacings along the horizontal direction. The positions of the electrodes 19, 20, and 21 are midway between the positions of respective pairs of the adjacent line cathodes 10 as seen in the direction Z perpendicular to both the horizontal direction and the vertical direction (see FIG. 2). The first set of these horizontal deflection electrodes along the beam path, designated by numeral 19, will be referred to as the DH-1 electrodes, while the second group 20 will be referred to as the DH-2 electrodes and the third group 21 will be referred to as the DH-3 electrodes. Alternating ones of the set of the DH-1 electrodes 19 are connected to respective ones of a pair of bus leads 22. Similarly, alternating ones of the set of the DH-2 electrodes 20 are connected to respective ones of a pair of bus leads 23, and alternating ones of the set of the DH-1 electrodes 21 are connected to respective ones of a pair of bus leads 24. A DC potential is applied to the DH-3 electrodes 21. This DC potential is identical to a potential which is applied to a metal back electrode 26 formed over a photo-emissive or phosphor layer 27 on the inner surface of the faceplate 28. Voltages are applied to the DH-1 electrodes 19 and the DH-2 electrodes 20 so as to horizontally focus the electron beams.

Since the display device of this embodiment is of the color type, the phosphor layer 27 is made up of sequential red-emissive, green-emissive and blue-emissive stripes formed of suitable phosphor materials. The red, green and blue stripes are denoted by the characters R, G and B respectively in FIG. 2. These color stripes are mutually separated by black stripes.

In operation, heating current pulses are passed through the line cathodes 10 to heat them and thereby enable electron emission, as will be described in more detail hereinafter. During the absence of the heating current pulses, display data or video signals are applied to the line cathodes 10, as will be described in more detail hereinafter.

Voltages are applied to the vertical scanning electrodes 12, the G1 electrode 13, and the G2 electrode 14. The voltages applied to the vertical scanning electrodes 12 and the G1 electrode 13 are roughly similar to the effective potential of the line cathodes 10. The voltage applied to the G2 electrode 14 is higher than the effective potential of the line cathodes 10. For example, the voltage applied to the G2 electrode 14 is in the range of 100 to 300 V. This setting of the voltages or potentials at the line cathodes 10 and the electrodes 12–14 allows the emitted electrons to move away from the line cathodes 10 toward the G2 electrode 14 through the apertures in the G1 electrode 13. The electrons moving through the apertures in the G1 electrode 13 form respective electron beams. The potential of the line cathodes 10 relative to the potentials of the other electrodes, especially relative to the potential of the G1 electrode 13, determines the amounts of beam current of these electron beams. Since this relative potential at the line cathodes 10 depends on the video signal as described in detail hereinafter, the amounts of beam current of the electron beams vary with the video signal. In this way, the electron beams are modulated in accordance with the video signal. The voltage applied to the G1 electrode 13 is chosen to cut off the electron beam when the video signal assumes a black level and to enable the electron beam when the video signal moves from the black level toward a white level.

Since the vertical scanning electrodes 12 are positioned in close proximity to the line cathodes 10, the polarity of the voltage applied to the vertical scanning electrodes 12 serves to selectively decrease and increase the potential of the space surrounding each line cathode 10 below and above the potential of the line cathode 10 and thereby to selectively enable and inhibit the emission of electron beams. At any specific time, during scanning to produce a television image, only one electron beam is emitted from one of the line cathodes 10 through one of the apertures in the G1 electrode 13.

This electron beam, after emerging from the G1 electrode 13, sequentially passes through the corresponding apertures in the G2 electrode 14, the G3 electrode 15, the G4 electrode 16, the vertical deflection electrodes 20 and 21, and the three sets of the horizontal deflection electrodes 19, 20, and 21. Voltages of predetermined levels are applied to the electrodes 15–21, which result in the electron beam being focused to form a small spot of suitable size on the phosphor layer 27. Beam focusing in the vertical direction is implemented by an electrostatic lens formed between the G3 electrode 15, the G4 electrode 16, and the vertical deflection electrodes 17 and 18. Horizontal beam focusing is performed by an electrostatic lens formed between the three sets of the horizontal deflection electrodes 19, 20, and 21. These two electrostatic lenses are formed only in the horizontal and the vertical directions, so that vertical and horizontal adjustment of the beam spot size can be performed mutually independently through adjustment of the voltages applied to the electrodes which form the electrostatic lenses.

Periodically varying deflection voltages of identical amplitude are applied to the buses 22, 23, and 24 which are respectively connected to the horizontal deflection electrodes 19, 20, and 21. These deflection voltages take a waveform such as a sawtooth waveform, a triangular waveform, or a stepwise-varying waveform. The application of these deflection voltages to the horizontal deflection electrodes 19–21 produces horizontal deflection of the electron beam through a predetermined displacement to thereby execute horizontal scanning of the electron beam across the phosphor layer 27.

Figure 4:
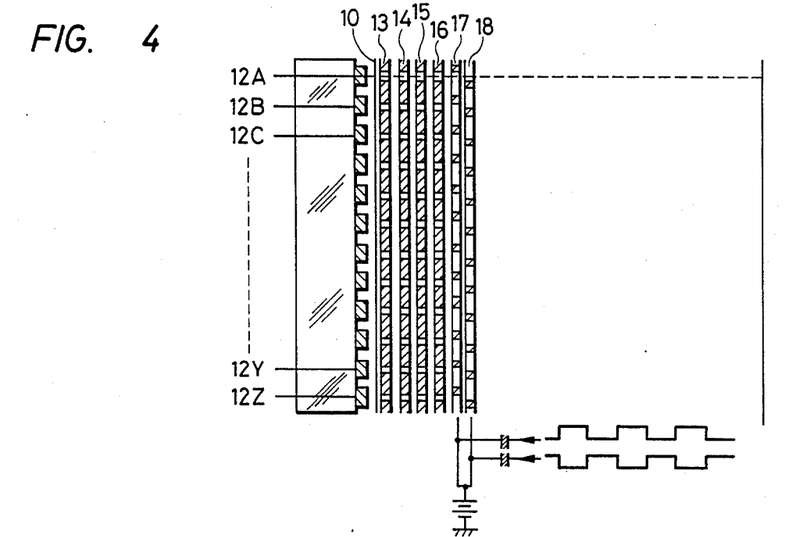
FIG. 4 is a vertical cross-sectional view of a portion of the display device of FIG. 1.
Figure 5:
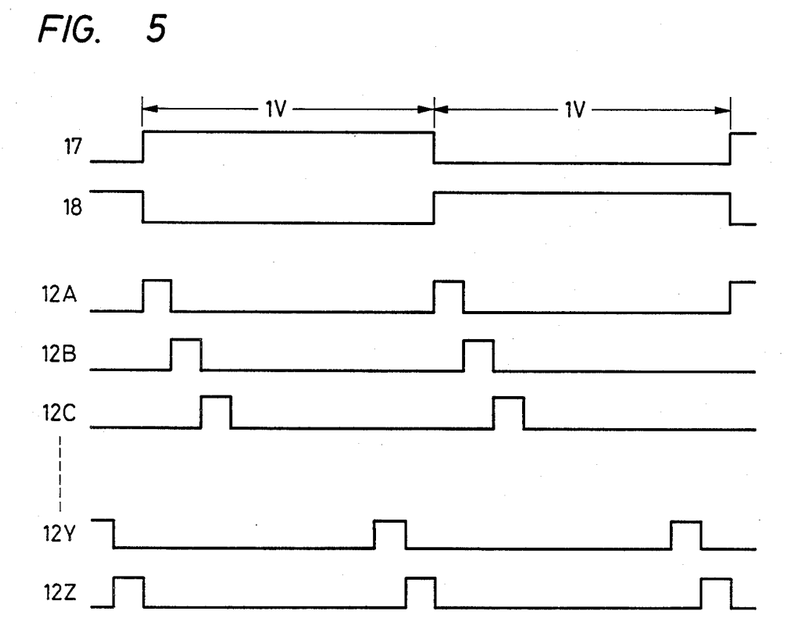
FIG. 5 is a timing diagram of signal waveforms applied to the electrodes of the display device of FIG. 1

The vertical scanning operation will be described with reference to FIGS. 4 and 5. Variations in the voltages at the electrodes of FIG. 4 are indicated by the waveforms of FIG. 5 in which the same reference characters are used to denote the waveforms of the voltages at the corresponding electrodes. As described previously, the voltage applied to the vertical scanning electrodes 12 determines whether the emission of electron beams from the line cathodes 10 is enabled or inhibited. A level of the voltage applied to the vertical scanning electrodes 12 which enables the electron beam emission will be referred to as an enabling voltage, while a corresponding voltage level which inhibits the electron beam emission will be referred to as a cut-off voltage. As the array of the vertical scanning electrodes 12 is closer to the array of the line cathodes 10, smaller enabling and cut-off voltages can produce desired control of the electron beam emission. Vertical scanning is performed by successively applying the enabling voltage to each of the vertical scanning electrodes 12 (i.e., 12A, 12B, 12C, ..., and 12Z shown in FIG. 4) during one horizontal scanning interval 1H, with the other vertical scanning electrodes being subjected to the cut-off voltage. It will be assumed that interlaced scanning is to be performed. During a first field, the vertical scanning electrodes 12 are successively scanned as described above, while predetermined voltages superimposed over a fixed DC voltage are respectively applied to the vertical deflection electrodes 17 and 18, as is made clear in FIGS. 4 and 5. During the succeeding field, the vertical scanning electrodes 12 are again successively scanned, but with the polarities of the respective superimposed voltages applied to the vertical deflection electrodes 17 and 18 being inverted. It can thus be understood that the vertical deflection electrode 17 will be more positive in potential than the vertical deflection electrode 18 during a first field, whereas the opposite condition will be produced during a second field. The variations of the relative voltage levels of the vertical deflection electrodes 17 and 18 are made such as to deflect the electron beams by an amount, between successive fields, which is sufficient to produce interlaced scanning across the phosphor layer 27 (see FIGS. 1–3).

Figure 6:
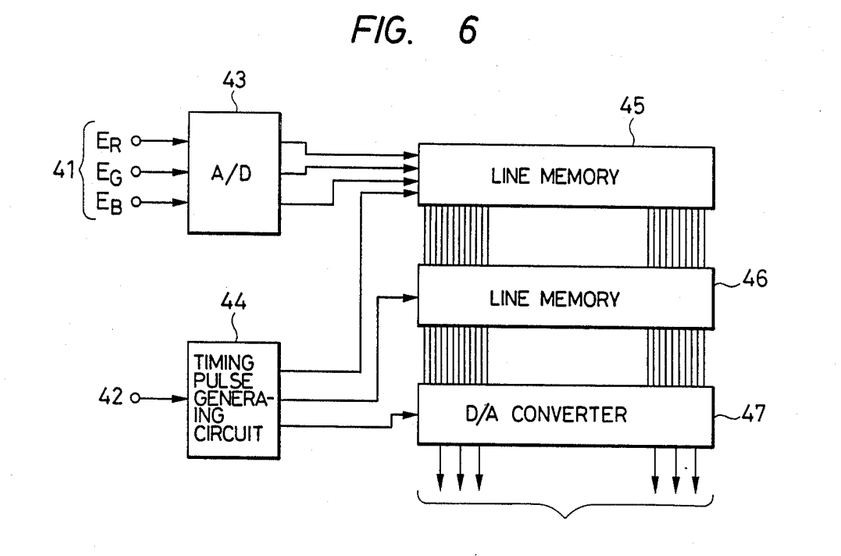
FIG. 6 is a block diagram of a video signal processing circuit in the first embodiment of this invention.

As shown in FIG. 6, a video signal processing circuit includes a timing pulse generating circuit 44 which produces timing pulses at timings based on those of a television synchronizing signal applied to an input terminal 42. An analog-to-digital (A/D) converter 43 receives three demodulated primary color signals (denoted by the characters $E_R$, $E_G$, and $E_B$) corresponding to the red, blue, and green primary color components of the video signal. The A/D converter 43 derives digital signals from these primary color signals through analog-to-digital conversion. The resultant digital signal data for one horizontal scanning interval (referred to as a 1H interval) is stored sequentially in a line memory 45, at timings determined by timing pulses from the generator 44. When data for a complete horizontal scanning line has been stored in the line memory 45, the data is transferred simultaneously in parallel to a second line memory 46. Signals for the next 1H interval then begin to be successively stored in the first line memory 45. The data thus stored in the second line memory 46 is held therein during a 1H interval, during which the data is applied in parallel to a digital-to-analog (D/A) converter or pulse-width modulator 47 to be converted back into analog signal form or into pulse-width modulated signals. As will be made clear hereinafter, these analog signals are amplified and applied to the line cathodes 10 to modulate the electron beams in accordance with the display data or video signals. It can be understood that the line memories 45 and 46 are used for time axis conversion. In addition, it should be noted that the internal structure of this video signal processing circuit may be replaced by structures of other known video signal processing circuits.

Figure 7:
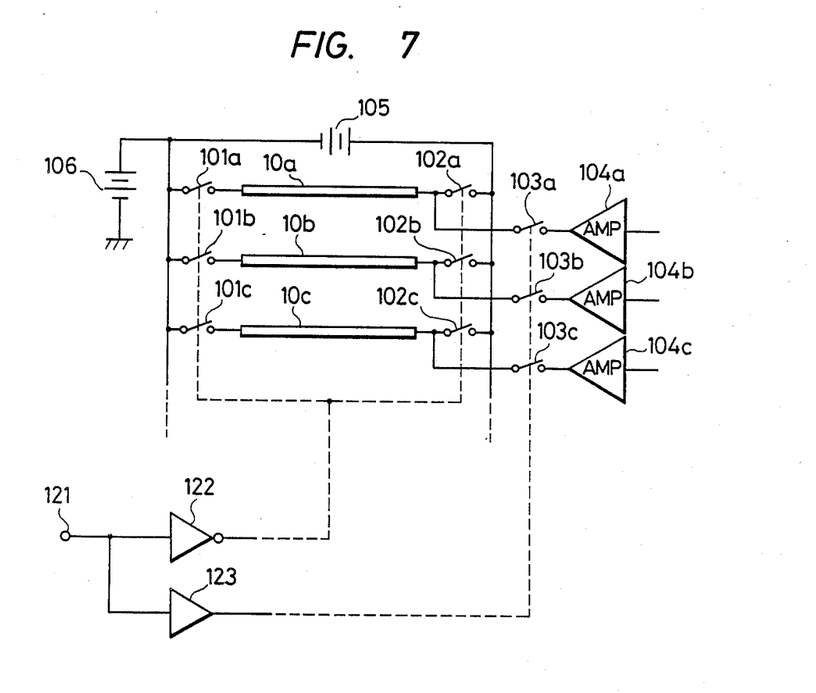
FIG. 7 is a diagram of a cathode control circuit in the first embodiment of this invention.

As shown in FIG. 7, a cathode control circuit includes DC power sources 105 and 106 generating predetermined constant DC voltages. The negative terminal of the DC power source 105 is connected to the positive terminal of the DC power source 106. The negative terminal of the DC power source 106 is grounded. First ends of the line cathodes (denoted by the characters 10a, 10b, 10c, ... in FIG. 7) are connected via respective switches (denoted by the characters 101a, 101b, 101c... in FIG. 7) to the junction between the negative terminal of the DC power source 105 and the positive terminal of the DC power source 106. It should be noted that only three of these line cathodes and three of these switches are shown in FIG. 7. The other ends of the line cathodes are connected via respective switches (denoted by the characters 102a, 102b, 102c, ... in FIG. 7) to the positive terminal of the DC power source 105. It should be noted that only three of these switches are shown in FIG. 7.

When the switches 101a-101c and 102a-102c are closed, heating direct currents are passed through the line cathodes 10a-10c by the DC power source 105. These currents heat the line cathodes 10a-10c. In addition, when the switches 101a-101c are closed, a positive voltage or bias is applied to the line cathodes 10a-20c by the DC power source 106. The bias applied to the line cathodes 10a-10c is chosen to cut off electron beams. Accordingly, when the switches 101a-101c and 102a-102c are closed, the electron beams are cut off, although the line cathodes 10a-10c are supplied with the heating currents.

When the switches 101a-101c and 102a-102c are opened, the supply of the heating currents to the line cathodes 10a-10c is interrupted and simultaneously the line cathodes 10a-10c are relieved from the bias voltage. During a certain period following the interruption of the supply of the heating currents, the line cathodes 10a-10c generally remain at high temperatures adequate to enable electron emission. Accordingly, provided that the line cathodes 10a-10c have been sufficiently heated by the heating currents, when the switches 101a-101c and 102a-102c are opened and thus the line cathodes 10a-10c are relieved from the bias voltage, the line cathodes 10a-10c are allowed to exit electron beams in spite of the fact that the supply of the heating currents to the line cathodes 10a-10c is interrupted.

Input terminals of video amplifiers (denoted by the characters 104a, 104b, 104c, ... in FIG. 7) are connected to output terminals of the D/A converter 47 (see FIG. 6) to receive the analog video signals respectively. It should be noted that only three of the video amplifiers are shown in FIG. 7. The video signals are magnified by the respective video amplifiers. Output terminals of the video amplifiers are connected to the other ends of the line cathodes via switches (denoted by the characters 103a, 103b, 103c, ... in FIG. 7) respectively. It should be noted that only three of these switches are shown in FIG. 7. When the switches 103a-103c, ... are closed, the amplified video signals are applied to the line cathodes 10a-10c respectively. When the switches 103a-103c are opened, the application of the amplified video signals to the line cathodes 10a-10c is interrupted.

It should be noted that the switches 101a-101c, 102a-102b, and 103a-103c preferably include switching devices such as transistors or field-effect transistors.

Horizontal blanking pulses are applied to a terminal 121. The input terminal of an inverting buffer 122 is connected to the terminal 121 to receive the horizontal blanking pulses. The output terminal of the inverting buffer 122 is connected to control terminals of the switches (denoted by the characters 101a, 101b, 101c, ... and 102a, 102b, 102c, ... in FIG. 7). The device 122 inverts the horizontal blanking pulses, and the resulting pulses are applied to the control terminals of these switches. The input terminal of a non-inverting buffer 123 is connected to the terminal 121 to receive the horizontal blanking pulses. The output terminal of the non-inverting buffer 123 is connected to control terminals of the switches (denoted by the characters 103a, 103b, 103c, ... in FIG. 7). The horizontal blanking pulses are applied to the control terminals of these switches via the non-inverting buffer 123.

The switches (denoted by the characters 101a, 101b101c, ..., 102a, 102b, 102c, ..., and 103a, 103b, 103c, ... in 101c, ..., 102a, 102b, 102c, ..., and 103a, 103b, 103c, ... in FIG. 7) are controlled in accordance with horizontal blanking pulses. Specifically, during the presence of a horizontal blanking pulse, the switches 101a-101c and 102a-102c are closed but the switches 103a-103c are opened, so that the heating currents pass through the line cathodes and the application of the video amplifier output signals to the line cathodes is interrupted. Accordingly, during the presence of a horizontal blanking pulse, the line cathodes are heated. In addition, during the presence of a horizontal blanking pulse, the bias voltage is applied to the line cathodes so that electron emission from the line cathodes is prevented or inhibited.

During the absence of a horizontal blanking pulse, the switches 101a-101c and 102a-102c are opened but the switches 103a-103c are closed, so that the supply of the heating currents to the line cathodes are interrupted but the video signals are applied to the line cathodes. Thus, the potentials of the line cathodes relative to the potentials of the adjacent electrodes such as the G1 electrode 13 reflect the video signals. In addition, during the absence of a horizontal blanking pulse, the line cathodes are relieved from the bias voltage. Accordingly, during the absence of a horizontal blanking pulse, electron beams from the line cathodes are enabled and also they are modulated in accordance with the video signals. It should be noted that during the absence of a horizontal blanking pulse, the line cathodes remain at sufficiently high temperatures as a result of the exposure to heating process in the peceding presence of a horizontal blanking pulse.

Since horizontal blanking pulses periodically occur, the supply of heating currents to the line cathodes are periodically enabled and inhibited and also the electron beam emission is periodically enabled and inhibited. During each periodical presence of the electron beam, the electron beam is modulated in accordance with the corresponding video signal.

The single plate structure of the G1 electrode 13 prevents or reduces an inequality in electron beams which could easily occur in the case of separated G1 electrodes. The load capacitances of the video amplifies (denoted by the characters 104a, 104b, 104c, ... in FIG. 7), that is, the load capacitances of an electron beam modulation circuit, are extremely small, since the cathodes 10 are composed of lines or wires having a diameter of several tens of μm.

DESCRIPTION OF THE SECOND PREFERRED EMBODIMENT

Figure 8:
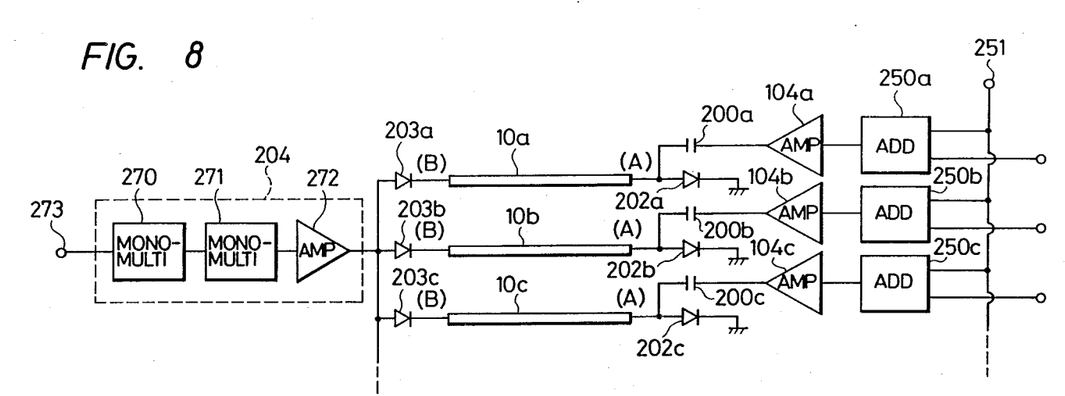
FIG. 8 is a diagram of a cathode control circuit in a second embodiment of this invention.
Figure 9:
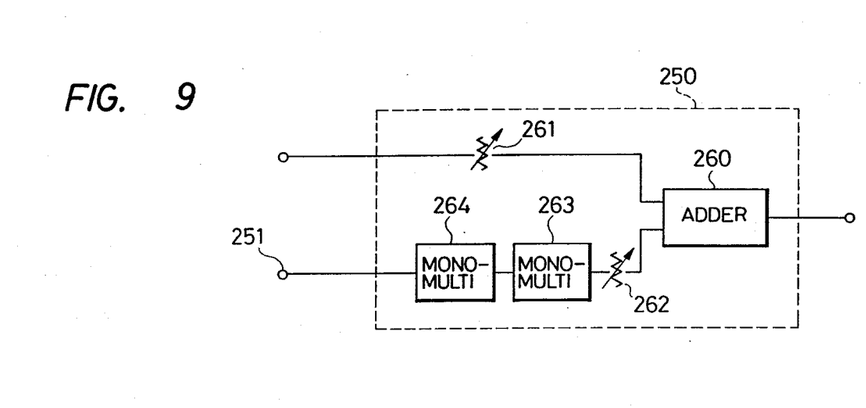
FIG. 9 is a block diagram of the internal structure of the adding circuits of FIG. 8.

FIGS. 8 and 9 show a second embodiment of this invention which is similar to the embodiment of FIGS. 1-7 except for the following design changes.

As shown in FIG. 8, first input terminals of adding circuits (denoted by the characters 250a, 250b, 250c, ... in FIG. 8) are connected to a terminal 251 subjected to horizontal blanking pulses, so that they receive the horizontal blanking pulses. It should be noted that only three of the adding circuits are shown in FIG. 8. Second input terminals of the adding circuits are connected to respective output terminals of the D/A converter 47 (see FIG. 6) to receive respective video signals. The output terminals of the adding circuits are connected to the input terminals of the video amplifiers (denoted by the characters 104a, 104b, 104c, . . . in FIG. 8). The adding circuits essentially superimpose the horizontal blanking pulses over the video signals. The resulting superimposed signals are applied to the input terminals of the video amplifiers.

The adding circuits have similar internal structures. FIG. 9 shows the internal structure of one of the adding circuits. As shown in FIG. 9, the adding circuit 250 includes an adder 260. A first input terminal of the adder 260 is connected to the corresponding output terminal of the D/A converter 47 (see FIG. 6) via a level adjusting variable resistor 261. A second input terminal of the adder 260 is connected to the terminal 251 via a level adjusting variable resistor 262, a monostable multivibrator 263, and a monostable multivibrator 264. These multivibrators 263 and 264 are of the adjustable time constant or adjustable pulse-width type. The combination of the multivibrators 263 and 264 serves to adjust the timing and the duration of output pulses. The output terminal of the adder 260 is connected to the corresponding video amplifier.

As shown in FIG. 8, the output terminals of the video amplifies (denoted by the characters 104a, 104b, 104c, . . . in FIG. 8) are connected to first ends (A) of the line cathodes (denoted by the characters 10a, 10b, 10c, . . . in FIG. 8) via capacitors (denoted by the characters 200a, 200b, 200c, . . . in FIG. 8) respectively. It should be noted that only three of the video amplifies, three of the line cathodes, and three of the capacitors are shown in FIG. 8. These ends (A) of the line cathodes are respectively connected to anodes of diodes (denoted by the characters 202a, 202b, 202c, . . . in FIG. 8) whose cathodes are grounded. The other ends (B) of the line cathodes are respectively connected to cathodes of diodes (denoted by the characters 203a, 203b, 203c, . . . in FIG. 8) whose anodes are connected in common to an output terminal of a cathode heating circuit 204.

The cathode heating circuit 204 includes a series combination of monostable multivibrators 270 and 271. The cathode heating circuit 204 also includes a power amplifier or switching circuit 272. The input terminal of the power amplifier 272 is connected via the combination of the devices 270 and 271 to a terminal 273 subjected to horizontal blanking pulses. The output terminal of the power amplifier 272 is connected to the diodes (denoted by the characters 203a,203b, 203c, . . . in FIG. 8). The cathode heating circuit 204 derives cathode heating pulses from the horizontal blanking pulses. The combination of the multivibrators 270 and 271 serves to adjust the timing and the duration of the cathode heating pulses.

Figure 10:
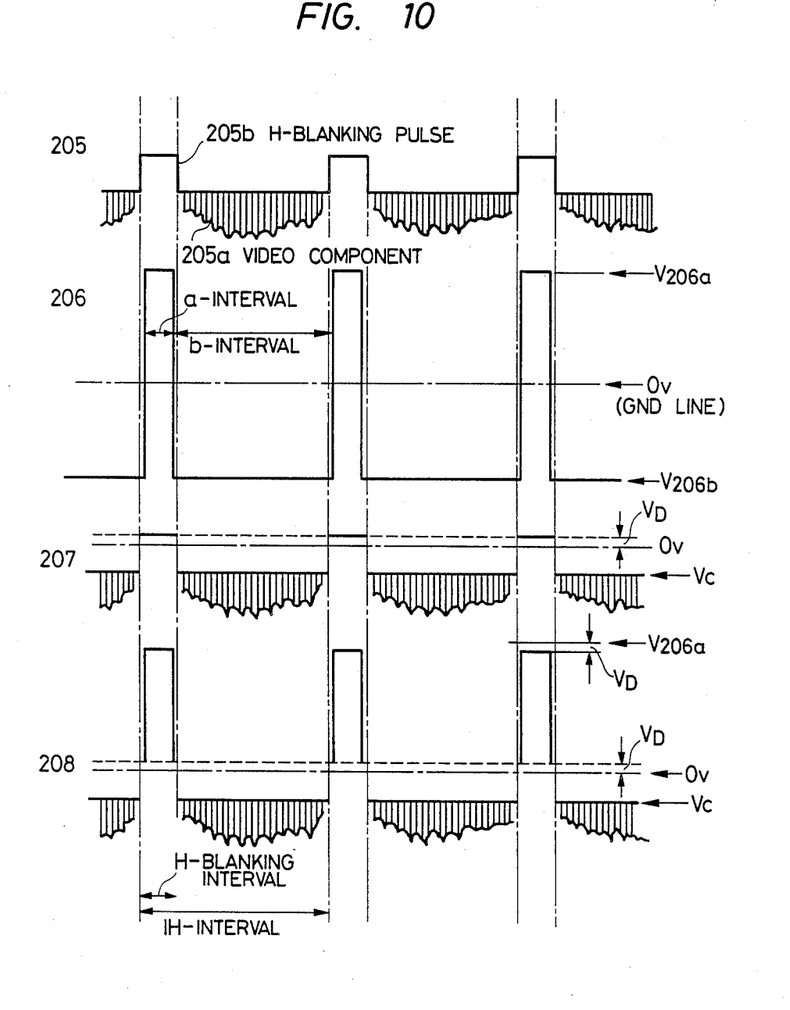
FIG. 10 is a timing diagram of waveforms at several points in the circuit of FIG. 8.

As shown by the waveform 205 of FIG. 10, the signal output by each of the video amplifiers is a superimposition of video components 205a and horizontal blanking pulses 205b. The video components 205a occur during the absence of a horizontal blanking pulse 205b. The horizontal blanking pulses occur at a frequency or period corresponding to a 1H interval. As shown by the waveform 206 of FIG. 9, the cathode heating circuit 204 outputs cathode heating pulses synchronous with the horizontal blanking pulses. Each cathode heating pulse lasts for a preset interval (a-interval) within the duration of a horizontal blanking pulse. In more detail, the output signal from the cathode heating circuit 204 assumes a preset positive level V206a during each a-interval and assumes a preset negative level V206b during other intervals (b-intervals). The absolute value of the voltage level V206b is greater than the amplitude of the video signal 205. The waveform 207 of FIG. 9 shows variations in the voltage at the ends (A) of the line cathodes. The waveform 208 of FIG. 9 shows variations in the voltage at the ends (B) of the line cathodes. The potential applied to the G1 electrode 13 and the potentials applied to the other electrodes are chosen so that the electron beam will be cut off at a voltage Vc of the line cathodes. Thus, the potential level Vc denotes an electron beam cut-off voltage.

As is understood from FIG. 9, during each a-interval within the duration of a horizontal blanking pulse, the cathode heating signal 206 remains at the positive level V206a, so that the diodes (denoted by the characters 202a, 202b, 202c, . . . and 203a, 203b, 203c, . . . in FIG. 8) are conductive and thereby heating currents flow through the line cathodes from the ends (B) to the ends (A). These currents heat the line cathodes. During each a-interval, the voltage 208 at the ends (B) of the line cathodes equals the voltage V206a minus a threshold level VD of the diodes 203a–203 c and is higher than or positive relative to the electron beam cut-off voltage Vc, and the voltage 207 at the ends (A) of the line cathodes equals a threshold level VD of the diodes 202a–202c and is higher than or positive relative to the electron beam cut-off voltage Vc. Accordingly, during an a-interval, the electron beam emission from the line cathodes is inhibited. In addition, during each a-interval, the diodes 202a–202c are conductive so that the voltage 208 at the ends (A) of the line cathodes is fixed to a level corresponding to a threshold level VD of the diodes 202a–202c independent of the signal outputted from the video amplifiers 104a–104c to the line cathodes via the capacitors 200a–200c. In other words, the level of each horizontal blanking pulse applied to the line cathodes is fixed at a value corresponding to the didode threshold level VD.

During each b-interval, the cathode heating signal 206 remains at the negative level V206b so that the diodes (denoted by the characters 202a, 202b, 202c, . . . and 203a, 203b, 203c, . . . in FIG. 8) are unconductive and thereby the line cathodes are electrically disconnected from the cathode heating circuit 204 and from the ground. This electrical disconnection of the line cathodes from the cathode heating circuit 204 and the ground inhibits the supply of heating currents to the line cathodes. During each b-interval, the potential of the line cathodes is equal to or negative relative to the electron beam cut-off voltage Vc so that the electron beam emission from the line cathodes is enabled. In addition, during each b-interval, all points of each line cathode between the ends (A) and (B) assume essentially the same potential which is modulated in accordance with the video signal outputted to the line cathode from the video amplifier via the capacitor. Accordingly, during the absence of each horizontal blanking pulse, the electron beam emitted from the line cathodes is modulated in accordance with the video signal.

The load capacitances of the video amplifiers 104a–104c, that is, the load capacitances of an electron beam modulation circuit, are equal to the sum of the capacitances between the line cathodes and the other electrodes and the junction capacitances of the diodes 202a–202c and 203a–203c, so that they are small.

As understood from the previous description, the diodes 202a–202c and 203a–203c serve as switches. These diodes may be replaced by other known switching devices. Furthermore, cathode heating circuits may be provided for the respective line cathodes. In this case, cross talk between the video signals applied to the respective line cathodes can be reduced.

DESCRIPTION OF THE THIRD PREFERRED EMBODIMENT

Figure 11:
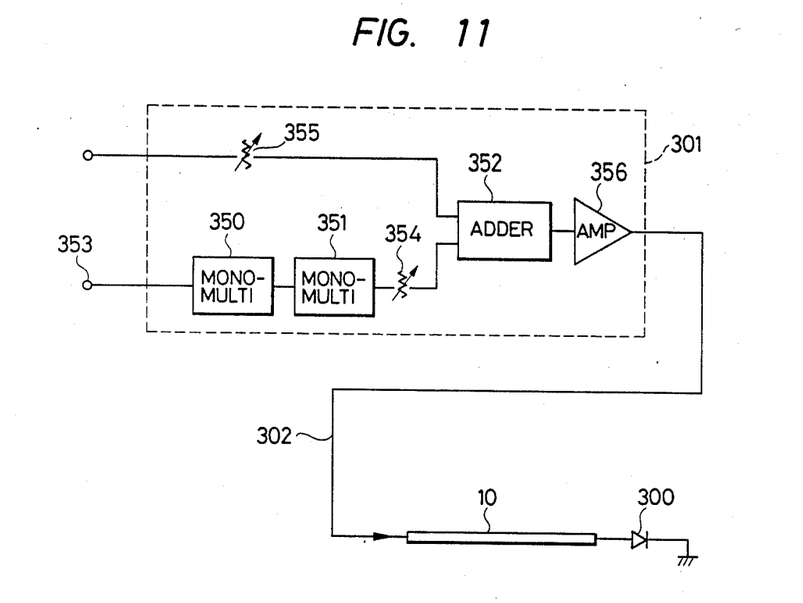
FIG. 11 is a diagram of a cathode control circuit in a third embodiment of this invention.

FIG. 11 shows a third embodiment of this invention which is similar to the embodiment of FIGS. 1-7 except for the following design changes.

As shown in FIG. 11, one ends (A) of the line cathodes 10 are respectively connected to anodes of diodes 300 whose cathodes are grounded. It should be noted that only one of the line cathodes and one of these diodes are shown in FIG. 11. The other ends (B) of the line cathodes 10 are connected to output terminals of cathode drive circuits 301 respectively. It should be noted that only one of the cathode drive circuits 301 is shown in FIG. 11. Each circuit 301 outputs a cathode drive signal 302 to the end (B) of the corresponding line cathode 10.

Each cathode drive circuit 301 includes a series combination of monostable multivibrators 350 and 351. The cathode drive circuit 301 also includes an adder 352. A first input terminal of the adder 352 is connected via the combination of the devices 350 and 351 to a terminal 353 subjected to horizontal blanking pulses. A level adjusting variable resistor 354 is connected between the adder 352 and the combination of the devices 350 and 351. A second input terminal of the adder 352 is connected via a level adjusting variable resistor 355 to the corresponding output terminal of the D/A converter 47 (see FIG. 6). The output terminal of the adder 352 is connected to the end (B) of the line cathode 10 via a power amplifier 356. The combination of the multivibrators 350 and 351 derives cathode heating pulses from the horizontal blanking pulses. The cathode heating pulses are synchronous with the horizontal blanking pulses. The multivibrators 350 and 351 are of the adjustable time constant or adjustable pulse-width type. The timing and the duration of the cathode heating pulses can be adjusted via the multivibrators 350 and 351. The timing and the duration of the cathode heating pulses are preferably chosen so that the cathode heating pulses reside within the corresponding horizontal blanking pulses. The adder 352 superimposes the cathode heating pulses over the video signal. The resulting superimposed signal is magnified by the amplifier 356 and is then applied to the corresponding line cathode 10.

Figure 12:
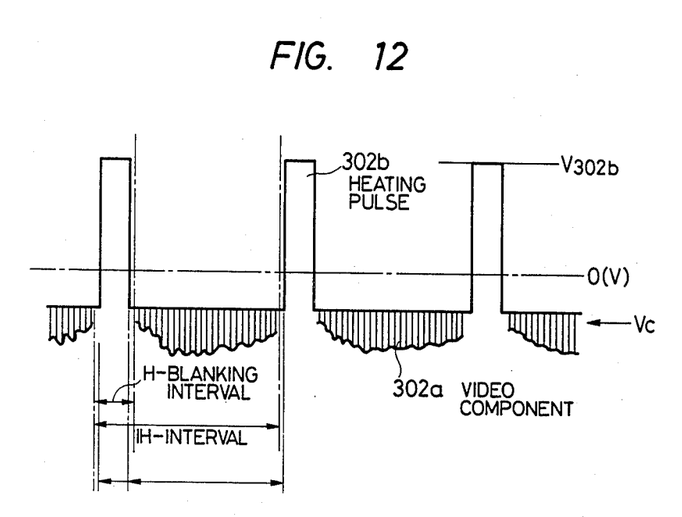
FIG. 12 is a waveform of a signal applied to the cathode in the circuit of FIG. 11.

As shown by the waveform of FIG. 12, the cathode drive signal 302 is a superimposition of video components 302a and cathode heating pulses 302b. The cathode heating pulses 302b are synchronous with horizontal blanking pulses. Each cathode heating pulse 302b lasts for an interval within the duration of a horizontal blanking pulse. The level of each cathode heating pulse 302b equals a preset positive voltage V302b. In other words, the cathode drive signal 302 assumes the positive level V302b during an interval corresponding to the duration of a cathode heating pulse. During other intervals, the cathode drive signal 302 assumes negative voltages which are equal to or negative relative to a preset potential corresponding to an electron beam cut-off voltage Vc.

During the presence of a cathode heating pulse 302b, the potential at the ends (B) of the line cathodes 10 equals the positive voltage V302b, so that the diodes 300 are conductive and thereby heating currents flow through the line cathodes 10 from the ends (B) to the ends (A). These currents heat the line cathodes 10. During the presence of a cathode heating pulse 302b, the voltage at the line cathodes 10 is positive relative to the electron beam cut-off voltage Vc so that the electron beam emission from the line cathodes 10 is inhibited.

During the absence of a cathode heating pulse 302b but the presence of video components 302a, the potential at the ends (B) of the line cathodes 10 is negative, so that the diodes 300 are unconductive and thus the ends (A) of the line cathodes 10 are electrically disconnected from the ground. This electrical disconnection of the line cathodes 10 from the ground interrupts the supply of the heating currents to the line cathodes 10. During the absence of a cathode heating pulse 302b but the presence of video components 302a, the potential of the line cathodes 10 is equal to or negative relative to the electron beam cut-off voltage Vc so that the electron beam emission from the line cathodes 10 is enabled. In addition, during the absence of a cathode heating pulse 302b but the presence of video components 302a, all points of each line cathode 10 between the ends (A) and (B) assume essentially the same potential which is modulated in accordance with the video components 302a. Accordingly, during this period, the electron beam emitted from the line cathodes 10 is modulated in accordance with the video signal.

The load capacitances of the cathode drive circuits 301, that is, the load capacitances of an electron beam modulation circuit, equal the sum of the capacitances between the line cathodes and the other electrodes, and the junction capacitances of the diodes 300 so that they are small.

As understood from the previous description, the diodes 300 serve as switches. The diodes 300 may be replaced by other known switching devices.

What is claimed is:

1. A method of driving a display device including a cathode for producing an electron beam, and a screen for emitting light in accordance with the electron beam, the method comprising the steps of:
   (a) during a first period, inhibiting production of the electron beam and supplying a heating current to the cathode to heat the cathode; and
   (b) during a second period, enabling production of the electron beam and applying a video signal to the cathode to modulate the electron beam in accordance with the video signal.

2. The method of claim 1 comprising the further step of using switching elements, respectively connected to opposite ends of the cathode, for selectively allowing and inhibiting supply of the heating current to the cathode, and for selectively allowing and inhibiting application of the video signal to the cathode.

3. The method of claim 1 comprising the further steps of using switching elements, respectively connected to opposite ends of the cathode, for selectively allowing and inhibiting supply of the heating current to the cathode, and
    applying the video signal to the cathode via a capacitor connected to one of the ends of the cathode.

4. The method of claim 3 comprising the further steps of grounding a first end of the cathode via a first diode, applying a pulse signal to a second end of the cathode via a second diode, providing to the pulse signal a positive potential during the first period and a negative potential during the second period, and applying the video signal to the first end of the cathode via the capacitor.

5. The method of claim 1 comprising the further steps of superimposing a positive pulse over the video signal during an interval corresponding to the second period, applying the superimposed signal to a first end of the cathode, and grounding a second end of the cathode during the first period.

6. The method of claim 5 wherein said grounding step comprises grounding the second end of the cathode via a diode.

7. A method of driving a display device including a cathode for producing an electron beam, and a screen for emitting light in accordance with the electron beam, the method comprising the steps of:
(a) heating the cathode by applying a heating current to the cathode;
(b) applying a video signal to the cathode to modulate the electron beam in accordance with the video signal;
(c) during a first period, enabling supply of the heating current to the cathode and inhibiting application of the video signal to the cathode; and
(d) during a second period, enabling the application of the video signal to the cathode and inhibiting the supply of the heating current to the cathode.

8. A display device comprising:
(a) a cathode for producing an electron beam;
(b) a screen for emitting light in accordance with the electron beam;
(c) means for heating the cathode by supplying a heating current to the cathode;
(d) means for applying a video signal to the cathode to modulate the electron beam in accordance with the video signal,
wherein the heating means comprises means for supplying a heating current to the cathode;
(e) means for, during a first period, enabling supply of the heating current to the cathode and inhibiting application of the video signal to the cathode; and
(f) means for, during a second period, enabling the application of the video signal to the cathode and inhibiting the supply of the heating current to the cathode.

9. A display device comprising:
(a) a cathode for producing an electron beam;
(b) a screen for emitting light in accordance with the electron beam;
(c) applying means for applying a video signal to the cathode to modulate the electron beam in accordance with the video signal;
(d) timing means for establishing a repetitive sequence of alternating time periods;
(e) inhibiting means for inhibiting said applying means from application of said video signal during alternate ones of said time periods;
(f) heating means for heating the cathode;
(g) control means for controlling said heating means to heat the cathode during the time periods wherein said inhibiting means inhibits said applying means;
(h) said control means comprising means for inhibiting said heating means form heating the cathode during other time periods alternating with said alternate ones of said time periods;
(i) said control means thereby operable in cooperation with said inhibiting means for alternating periods of application of said video signal to the cathode with periods of heating of the cathode.

10. A display device as recited in claim 9, wherein said timing means comprises means for providing horizontal blanking pulses, said inhibiting means and said control means being responsive to said horizontal blanking pulse for controlling said heating means to heat the cathode and for inhibiting said applying means from application of said video signals during blanking intervals and for inhibiting said heating means from heating the cathode and permitting said applying means to apply said video signals during line scanning intervals alternating with said blanking intervals.

11. A display device as recited in claim 9, wherein said timing means comprises means responsive to a sequence of timing pulses and for obtaining therefrom a pair of pulse sequences,
said control means further including:
first means for applying a first pulse sequence output by said timing means to said heating means for controlling said heating means to heat the cathode during said timing pulses, and
second means for applying a second pulse sequence output by said timing means to said inhibiting means for inhibiting said applying means for applying said video signals to the cathode during said timing pulses.

12. A display device as recited in claim 11 wherein said inhibiting means comprises controlled switching means responsive to said second pulse sequence output by said second means, and
said heating means comprising electrical power source means and second controlled switching means responsive to said first pulse sequence output by said first means,
one of said first and second means operable for inverting said sequence of timing pulses to provide one of said first and second pulse sequences, and
the other of said first and second means operable for providing the other of said first and second pulse sequences with the same polarity as said timing pulses.

13. A display device as recited in claim 9 wherein said inhibiting means comprises adder means, having first and second inputs and an output, for providing to the cathode an output signal as a sum of said video signal, applied to the first input thereof, and a sequence of first pulses derived from a sequence of timing pulses applied to the second input thereof,
said control means comprises means for providing to the cathode an output signal representing a sequence of second pulses derived from said timing pulses input thereto,
said timing means comprising diode means responsive to outputs from said inhibiting means and said control means to provide a conduction path between a power source of said heating means and the cathode to provide heating of the cathode during said timing pulses,
said diode means responsive to outputs from said inhibiting means and said control means in absence of said timing pulses for removing said conduction path between said power source of said heating means and the cathode and for providing said video signal to the cathode from said adder means.

14. A display device as recited in claim 13 wherein said timing means further comprises first adjustable pulse generating means connected between said sequence of timing pulses and said second input of said inhibiting means, for providing to said first pulses predetermined timings and durations, and second adjustable pulse generating means connected between said timing pulses and said control means, for providing to said second pulses predetermined timings and durations.

15. A display device as recited in claim 14, wherein said inhibiting means further comprises first and second level adjusting means for adjusting voltage amplitudes input to said first and second inputs of said adder means.

16. A display device as recited in claim 9, wherein said inhibiting means comprises adder means, having first and second inputs and an output, for providing to the cathode an output signal as a sum of said video signal, applied to the first input thereof, and a sequence of first pulse derived from a sequence of timing pulses applied to the second input thereof, said control means comprises conduction means for establishing a conduction path between a power source of the heating means and the cathode during said timing pulses, said conduction means comprising diode means responsive to outputs from said inhibiting means to provide said conduction path to provide heating of the cathode during said timing pulses, said diode means responsive to outputs from said inhibiting means in absence of said timing pulses for removing said conduction path to inhibit heating current flow in the cathode in absence of said timing pulses and for providing said video signal to the cathode from said adder means in absence of said timing pulses.

* * * * *